Figure 1:
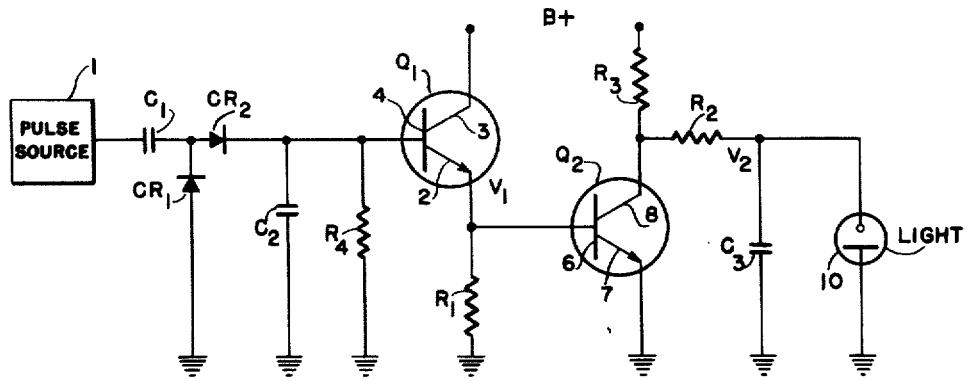

United States Patent Office 2,942,189
Patented June 21, 1960

2,942,189
TRANSISTORIZED CIRCUIT TO INDICATE THE ABSENCE OR PRESENCE OF A POSITIVE OR NEGATIVE PULSE

James J. Shea, Scotch Plains, Richard H. Holmberg, Warren Township, Plainfield, and Marshall R. Boggio, Point Pleasant, N.J., assignors, by mesne assignments, to the United States of America as represented by the Secretary of the Navy Filed Jan. 31, 1958, Ser. No. 712,568

3 Claims. (Cl. 324—133)

The invention described herein may be manufactured and used by or for the Government of the United States of America for governmental purposes without the payment of any royalties thereon or therefor.

This invention relates to trouble-indicating devices for indicating the malfunctioning of a complex electronic system, and more particularly to a circuit arrangement to indicate the presence or absence of either negative or positive pulses in the units of a complex electronic system.

An electronic function of fundamental importance in electronic technology is the formation and shaping of pulses. In radar, for example, pulses are generated or otherwise employed in timing generators, multivibrators, gating circuits, sweep generators, unblanking, marking generators etc. It is readily apparent that the quick detection of malfunctioning of any of the above units, resulting in the absence of pulses therein or their improper generation, is important in maintaining a complex radar system operative.

Heretofore in detecting abnormal operation, resulting in the absence of pulses in any unit of a system, complex waveform analysis and test equipment has been employed to detect the trouble. These complex equipment arrangements are time-consuming to set up and almost universally employ an oscilloscope to indicate the presence or absence of wave spectra. In military applications, for example, where radar is relied upon for viewing targets of increasing mobility it can be readily appreciated that quick-response trouble-indicating devices are increasing in importance. Commercial applications are of no less importance when it is realized that down-time of radiant energy transmission and receiving systems, as for example, television systems, can be quite expensive.

It is a principal object of the present invention to provide a simple and inexpensive two-stage circuit arrangement, equally applicable to commercial and military applications, for quickly indicating the presence or absence of pulses of either polarity in any unit of an electronic system emitting or making use of such pulses.

Another object is to provide a circuit arrangement capable of being "built in" in any "plug-in-unit" of a complex electronic system to indicate immediately an abnormal operation.

Still another object is to provide a simple, compact circuit arrangement capable of being embodied in a portable servicing tool or probe test device of relatively small dimensions.

It is a feature of the illustrated circuit arrangement according to the invention that it employs transistor amplifiers and allows of miniaturizing the arrangement to reduce size and weight which is important in military and commercial applications, more particularly in airborne equipments. The use of transistors allows the circuit arrangement to function with little power and low heat generation and thus does not appreciably add to the quantity of heat to be dissipated.

Still another feature is that the transistors are connected in cascade in two-stages with an emitter-follower forming a first stage isolating the impedance of the circuitry ahead of it and yielding a substantially medium-gain circuit wherein transistor noise is not significant that the circuit is not limited to high frequency response characteristics and can accordingly function over a broad range of pulse repetition rates or frequencies.

The first stage transistor is arranged to develop a first voltage signal output in dependence upon a charge on a capacitor which is charged when pulses of either polarity are received by the circuit. Under control of the first signal, a second stage comprising a second semi-conductor or transistor connected in cascade with the first transistor controls in turn a second voltage signal with the second signal increasing in value in dependence upon the absence of the first signal and decreasing in value with the presence of the first signal. The second signal is applied to a combination of elements causing repetitive oscillations so that the circuit is caused to function as a relaxation oscillator which indicates malfunctioning visually by a flashing signal when the device is not receiving pulses. When the system is functioning properly with pulses being transmitted, the warning light is extinguished.

Other objects, features and advantages of the invention will be understood from the following description and claims in conjunction with the accompanying drawings which illustrate by way of example preferred embodiments of the circuit arrangement and in which Fig. 1 is a schematic diagram of a circuit arrangement according to the invention.

Figure 2:
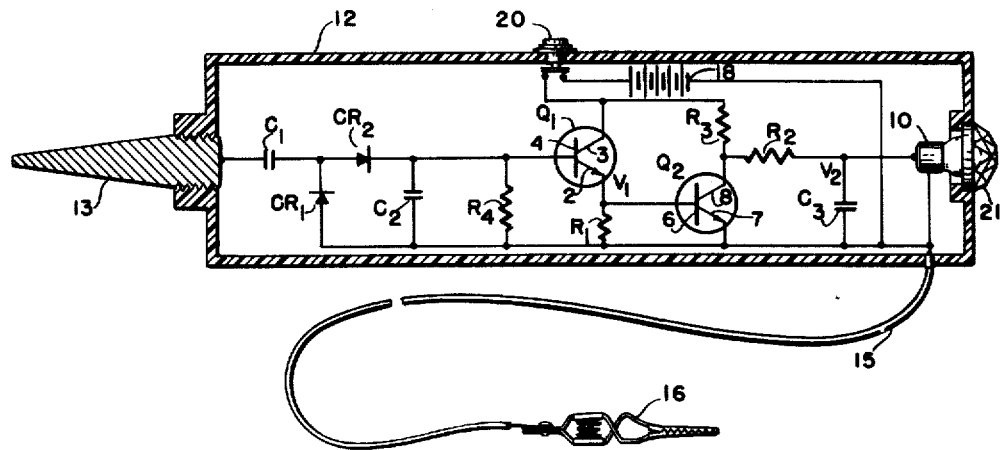

Fig. 2 is a sectional view of a portable test device embodying therein the circuit of Fig. 1.

While the circuit arrangement comprising the invention will hereinafter be described as being intended for use with a source of pulses it will be clearly understood that the term "source" is herein employed as a generic term covering both individual circuits in a unit or the unit itself of an electronic system. Moreover the term is intended to denote circuits or units wherein temporary flows of current occur as pulses of either polarity whether these pulses be generated or emitted by said circuits or are simply applied thereto from other pulse generating means.

Referring to Fig. 1, the circuit arrangement according to the invention is "built-in" in an electronic system or unit and connected to a source of pulses 1. The circuit comprises a first emitter-follower stage comprising a first transistor amplifier $Q_1$ with a load impedance $R_1$ connected to its emitter 2 and grounded as shown. The transistor is arranged so that its collector 3 has a direct current voltage applied thereto from a B+ power source as indicated. Connected between its base 4 and capacitor $C_1$ coupled to the pulse source is a pair of unidirectional elements or crystal diodes $CR_1$ and $CR_2$ arranged to pass current in the directions shown. A capacitor $C_2$ selectively charged in a manner later herein described is connected in parallel with a resistance $R_4$ to the base 4 and to diode $CR_2$ and both are connected to ground.

A second stage transistor $Q_2$ is connected in cascade with transistor $Q_1$ with $Q_2$'s base 6 connected to $Q_1$'s emitter 2, and $Q_2$'s emitter 7 is connected to ground. The second transistor's collector 8 is connected to the B+ source through an impedance element or resistance $R_3$. A resistance $R_2$ and capacitor $C_3$ combination are connected in series to the emitter 8 which along with a normally non-operative indicator, comprising a normally non-conductive gas discharge device or neon bulb 10 connected in parallel with $C_3$ and rendered operative or conductive when a predetermined voltage is applied thereto, are provided to visually indicate malfunctioning as a blinking indicator which readily attracts an operator's attention to the source of trouble.

The diodes $CR_1$ and $CR_2$ are preferably silicon small area junction type diodes which exhibit a very small shunt capacitance and a very high inverse resistance. Both of the transistors are of the N–P–N silicon junction type. However, it has been found that either germanium or silicon transistors may be employed in the first stage. With a voltage of 90 volts applied to transistor $Q_2$ it has been found that the device will accommodate pulses in the order of five volts peak to peak minimum with durations as short as 0.2 microsecond and a pulse repetition frequency of 50 cycles per second.

Pulses of either negative or positive polarity may be fed in through capacitor $C_1$ and diodes $CR_1$ and $CR_2$ from source 1. If the pulse received is negative the low impedance presented by diode $CR_1$ conducting to this negative pulse allows the combination $C_1CR_1$ to become a differentiator, and the resulting differential positive pulses pass through diode $CR_2$ and also charge capacitor $C_2$ positively. The charge on capacitor $C_2$ whether produced by a negative or positive pulse causes the transistor emitter-follower $Q_1$ to conduct more and develop a positive voltage $V_1$ across $R_1$. This positive voltage $V_2$ in turn causes transistor $Q_2$ to conduct more and drops voltage $V_3$, applied to the bulb 10, to a low enough value that the neon bulb cannot ionize. In the absence of pulses the output voltage $V_1$, of the first stage transistor amplifier decreases, which allows the voltage $V_3$ to increase to a predetermined value. This increase is sufficient to ionize the gas discharge device 10. As the neon bulb 10 conducts, the charge leaks off capacitor $C_3$ until the voltage has been reduced below that required to maintain the ionization, conduction is cut-off and the neon bulb is extinguished. Capacitor $C_3$ then charges up to the ionizing voltage and the neon bulb then ionizes again. Since the combination $R_2C_3$ and neon bulb 10 are connected to allow repetitive oscillations, the circuit is caused to function as a simple relaxation oscillator or neon oscillator so that the neon bulb 10 is a blinking indicator for the absence of pulses. When pulses are present, transistor $Q_2$ conducts sufficiently so that the charge on capacitor $C_3$ never builds up to the value required to ionize the neon bulb 10.

The invention may also be embodied in a portable test device as shown in Fig. 2 wherein the circuit of Fig. 1 is incorporated into such a device and the elements thereof are similarly numbered as in Fig. 1 in order to simplify the drawings. The test device comprises an insulated case 12 provided with a probe tip 13 made as an electrical conductor for selectively establishing an electrical connection with the pulse source to be tested for the presence or absence of pulses therein. The circuit arrangement is connected to the tip as shown with the elements therein being grounded. The device has a ground lead 15 provided with a clip 16 in known manner. The circuit is provided with an internal battery 18. However, instead of the power being constantly connected and applied to the device in the manner of a "built-in" circuit of Fig. 1, the portable device is provided with a switch 20 for selectively applying power to the device only during the test. The portable device functions in similar manner to the device described in Fig. 1 and the blinking neon light is visible through a glass cover 21.

It can readily be seen that the circuit arrangement provides a visual trouble shooting indicator for any type of electronic equipment either commercial or military and may be universally employed for monitoring any electrical signal. The invention when embodied as a "built-in" device can be disposed in any unit or several parts of a complex system to instantaneously indicate malfunctioning of the individual unit or part. The invention when embodied in a portable test device provides a lightweight, inexpensive tool providing a quick-detection trouble shooting indicator.

While preferred embodiments of the invention have been illustrated and described, it will be understood that the invention is in no way limited to these embodiments and that many changes may be made within the spirit and scope of the invention as defined by the following claims.

What we claim and desire to secure by Letters Patent is:

1. A circuit arrangement for use with a source of pulses for indicating the presence and absence of positive and negative pulses, comprising in combination, pulse receiving means, amplification means, a voltage source and a relaxation oscillator including a visual indicator means operable on the application of a predetermined voltage, said amplification means being operatively connected intermediate of said pulse receiving means and said relaxation oscillator, said arrangement being so constructed and arranged that said pulse receiving means will rectify and transmit to said amplifier as pulses of one polarity both positive and negative pulses, said rectified and transmitted pulses being amplified and utilized to control the application of voltage to said relaxation oscillator so that in the absence of pulses said voltage source will cause said relaxation oscillator including said visual indicator means to operate.

2. A circuit for use with a source of pulses for indicating the presence and absence of positive and negative pulses having a relaxation oscillator, means providing a source of voltage for operating said oscillator, control means for applying said voltage to said oscillator including pulse receiving means and amplification means so constructed and arranged that a positive or negative input pulse applied to said pulse receiving means will be transmitted to said amplification means, amplified, and utilized to prevent the application of said voltage to said relaxation oscillator for a predetermined period of time after the application of said input pulse.

3. A circuit arrangement for use with a source of pulses for indicating the presence and absence of positive and negative pulses, including in combination a first rectification means, a second rectification means, a capacitor, a first transistor amplifier, a second transistor amplifier, a relaxation oscillator including a visual operating indicator means and a voltage source, said circuit arrangement being so constructed and arranged that said first rectification means transmits pulses of a positive polarity and said second rectification means transmits pulses of a negative polarity to said capacitor so that both positive and negative pulses charge said capacitor to a uniform polarity, the voltage signal resultant from the charge on said capacitor being amplified successively by said first transistor and said second transistor, the output of said second transistor being utilized to prevent the application of sufficient operating voltage from said voltage source to said relaxation oscillator.

References Cited in the file of this patent

UNITED STATES PATENTS

| | | |
|---|---|---|
| 2,275,860 | Michaelis | Mar. 10, 1942 |
| 2,533,369 | Hartwig | Dec. 12, 1950 |
| 2,705,287 | Lo | Mar. 29, 1955 |
| 2,731,567 | Szikilai | Jan. 17, 1956 |
| 2,772,410 | Logue | Nov. 27, 1956 |
| 2,824,287 | Green et al. | Feb. 18, 1958 |
| 2,837,663 | Walz | June 3, 1958 |
| 2,851,638 | Wittenburg | Sept. 9, 1958 |